United States Patent [19]
Hutchison et al.

[11] Patent Number: 5,291,491
[45] Date of Patent: Mar. 1, 1994

[54] AVOIDANCE OF FALSE RE-INITIALIZATION OF A COMPUTER NETWORK

[75] Inventors: Jerry D. Hutchison, Littleton; Henry S. Yang, Andover, both of Mass.

[73] Assignee: Digital Equipment Corporation, Maynard, Mass.

[21] Appl. No.: 643,971

[22] Filed: Jan. 22, 1991

[51] Int. Cl.$^5$ .............................................. H04L 12/42
[52] U.S. Cl. ................................ 370/85.5; 340/825.05
[58] Field of Search .................... 370/85.5, 85.4, 85.13, 370/85.14, 85.15, 94.1, 94.2, 16, 16.1, 13; 340/825.05

[56] References Cited

U.S. PATENT DOCUMENTS

| | | | |
|---|---|---|---|
| 4,494,233 | 1/1985 | Bahr et al. | 370/85.5 |
| 4,813,039 | 3/1989 | Yoshihiro | 370/85.5 |
| 5,065,397 | 11/1991 | Shiobara | 370/85.5 |

Primary Examiner—Wellington Chin
Attorney, Agent, or Firm—A. Sidney Johnston; Albert P. Cefalo

[57] ABSTRACT

RingOp/Claim oscillations due to duplicate addresses and transmit aborts are avoided by using token preserver frames to reset the TVX timer in a station. A communications network having a plurality of stations capable of transmitting frames onto the network, and the stations capable of detecting transmission on the network, and the stations capable of taking predetermined action in the absence of detecting the transmission for a predetermined first time interval, and a first timer for measuring the predetermined first time interval. Measuring a second predetermined time interval, the second predetermined time interval being chosen to be less than the first predetermined time interval; transmitting a reset frame onto the network by a selected station at time intervals substantially equal to the second predetermined time interval, and the reset frames being capable of causing a station to reset the first timer to a beginning value. The network may be a token controlled ring. The reset frame may be a token preserver frame.

29 Claims, 9 Drawing Sheets

OWNERLESS VOID FRAME

IMPLEMENTER FRAME

WELL FORMED VOID FRAME

SELECTED STATION

OTHER STATIONS

AVOIDANCE OF FALSE RE-INITIALIZATION OF A COMPUTER NETWORK

FIELD OF THE INVENTION

This invention relates generally to a computer network for communication among a plurality of computers, and more particularly to avoiding false re-initialization of the network.

BACKGROUND OF THE INVENTION

A computer communications network is made up of a number of stations connected by a communications medium. A number of stations having a limited geographical extent is often referred to as a Local Area Network, or LAN. A number of LANs may be connected together by a variety of means in order to form a communications network. The LANs may be connected by bridges operating in the Medium Access Control, MAC, or Logical Link Layer, LLC of the OSI seven layer communications model, or alternatively, may be connected by routers operating in higher layers of the OSI seven layer model, or as a further alternative, may be connected by other means.

A note on terminology is in order. A number of LANs connected together will be referred to as a network. An individual LAN will be referred to as a system, as for example an ethernet IEEE 802.3 system, or for example a token ring IEEE 802.5 system, or for a further example an ANSI/IEEE FDDI token ring system, etc.

Quotation marks are used to enclose a phrase in order to improve the readability of a sentence. For example, a compound noun may be enclosed in quotation marks. However, in many sentences quotation marks are not needed for improved readability of the sentence, and so are not used.

The stations communicate by transmitting frames onto the medium, and by the stations detecting the frames. When a station detects a frame addressed to that station, then the station receives the frame by transferring the frame from the layer handling medium access, referred to as the MAC sublayer or Medium Access Control layer, to the LLC sublayer for delivery to a higher client layer. Frames transmitted or received for higher layers are called client frames.

For a token ring network, permission for a station to transmit onto the medium is controlled by a token which is passed from station to station. Possession of the token gives the station permission to transmit onto the medium.

Transmission errors or medium transients may cause frames or tokens to be corrupted. In order to detect and recover from these transient errors, each station maintains a timer in order to insure that a valid frame or token is received within a specified time period. For example, in both the IEEE 802.5 Token Ring Standard and in the Fiber Data Distributed Interface (FDDI) Standard, this timer is referred to as the Transmission Valid Timer, and is further referred to as the TVX timer. In this document the Transmission Valid Timer will be referred to as the TVX timer.

The TVX timer is assigned a timeout value. If a valid frame or token is not received within the timeout value, then the TVX timer will expire. Expiration of the TVX timer in a station typically causes the station to initiate fault recovery and ring initialization.

A number of conditions in stations on a communications network can cause the TVX timer to erroneously expire. Erroneous expiration of the TVX timer causes erroneous initiation of fault recovery and ring initialization, and consequently degrades performance of the ring communication network. The presence of a fault may cause repeated expirations of the TVX timer, and each expiration may then be followed by fault recovery and ring initialization. Repeated cycles of expiration of the TVX timer followed by initiation of fault recovery and ring initialization is described by the term, "RingOp/Claim oscillations". RingOp/Claim oscillations interfere with transmission of desired messages between stations, and may substantially prevent transmission of such messages.

A first exemplary condition causing erroneous expiration of the TVX timer is the situation where a station has a duplicate address of another station on the communications network. Duplicate station addresses are particularly severe problem in token controlled ring communications systems using source address stripping. The station having the duplicate address erroneously strips frames of the other station, causing a loss of traffic downstream from the stripping station. The prolonged loss of downstream traffic causes downstream stations to have their TVX timer expire, and to therefore erroneously initiate fault recovery and ring initialization. Accordingly, duplicate station addresses lead to RingOp/Claim oscillations, particularly in a communications system using source address stripping.

There are at least two cases of a station having a duplicate address. In the first case the two stations having duplicate addresses are connected into the same LAN, and in the second case the two stations having the duplicate addresses are in different LANs where the two LANs are connected, for example by a bridge, etc.

A station has a unique address, called "my address", used to identify the MAC layer of the station. Additionally, a station that forwards frames which originated in other stations, such as stations on other LANs, may maintain a table of source addresses referred to as a SA list. For example, when a bridge forwards a frame onto a LAN, the source address of the frame contains the "my address" of the originating station, and the SA list of the bridge station also contains the "my address" of the originating station so that the forwarding bridge station will have information in order to perform source address stripping and remove the frame from the LAN. Removal of the frame, by source address stripping, occurs after the frame circumnavigates a ring LAN and returns to the bridge station transmitting it onto the ring LAN.

As a further example of entries in a station's SA list, a station may use several addresses for reception and transmission of frames in addition to the "my address" of the station. Examples of additional addresses used for frame transmission include multiple protocol stacks in a station, addresses used for network management, et cet. And the addresses used for frame transmission in addition to the station's unique "my address" are entered into the station's SA list. And duplicate addresses in the SA lists of stations using source address stripping may lead to false re-initialization of the network.

A number of methods have been advanced in order to eliminate the presence of duplicate station address in a single LAN. For example, methods advanced for the FDDI network are Ring Management, RMT, and Station Management, SMT protocols. Particularly in SMT, Duplicate Address Test, DAT, which is part of Neighbor Notification protocol are helpful in dealing with stations on a single LAN, where the stations have duplicate "my addresses", and reference to ANSI documents describing these protocols is given hereinbelow in the Appendix.

However, the interconnection of LANs into ever larger networks may bring tens of thousands of stations into a large communications network. RMT and DAT become impractical as a means for detecting and dealing with stations having duplicate addresses in large networks having many interconnected LANs because RMT and DAT require execution of logic upon detection of frames. The logic is, for example, executed in software. And software is too slow for efficient use of the large network. Further, DAT procedures require transmission of Neighbor Information Frames, NIF frames, in order for stations to learn the addresses of their neighbor stations, and the addresses of other stations on the network. And transmission, reception, and processing of NIF frames requires bandwidth of the communications medium and is not practical for all tens of thousands of stations on a communications network of interconnected LANs. Accordingly, the presence of stations having duplicate addresses, where the stations are geographically widely distributed on different interconnected LANs, is not satisfactorily solved.

That is, in a single LAN, there may be a plurality of stations with each station having an SA list containing tens of thousands of addresses, both from "my address" of other stations in the network, and from additional addresses used by the various stations for transmission of frames. And any one of these tables may contain an address that is a duplicate of either a "my address" of a station in the LAN, or may be a duplicate of an entry in another station's SA list. Either of these conditions may cause Ring/Op claim oscillations as a result of source address stripping. And RMT and DAT are not a practical technique for locating the presence of such duplicate addresses.

A further example of erroneous fault recovery and ring initialization occurs in the situation where a bridge forwards frames from a first LAN to a second LAN and the bridge station on the second LAN does not keep a SA list, and a station address on the first LAN is duplicated in the second LAN. The bridge does not keep track of the source address in the SA field of the frame being forwarded, and simply forwards the frame with the source address field containing the source address contained in the arriving frame. ( Of course, in this example, the forwarded frame must be removed from the second LAN by a stripping method other than source address stripping. The other stripping method may use delimiter frames, or by counting frames transmitted and counting frames stripped, or by a combination of these process as disclosed in the article FRAME CONTENT INDEPENDENT STRIPPING FOR TOKEN RINGS, H. Y. Yang and K. K. Ramakrishnan, proceedings of the ACM, Sigcomm 1990, September 1990, or by other methods.)

A second exemplary condition causing erroneous expiration of the TVX timer is consecutive abortion of transmissions. For example, a number of conditions can lead to consecutive abortion of transmissions, including:

1) A single station repeatedly aborts transmission of frames due to internal station errors such as, for example, buffer errors. Other stations on the ring then timeout their TVX timers.

2) A number of stations repeatedly abort transmission of frames, resulting in the absence of a valid frame to circumnavigate the ring for a TVX timeout interval. For example, a station captures the token and aborts its transmission without transmitting a valid frame, and then releases the token. The next station then captures the token and also aborts its transmission without transmitting a valid frame, and then releases the token. The same sequence of aborts is then repeated by successive stations. The net result is that stations further downstream from these stations will see "aborted frames" and nothing else. These stations have their TVX timers expire because they do not receive a valid frame or token.

Accordingly, consecutive abortion of transmissions by either one station or by a succession of stations can lead to RingOp/Claim oscillations.

RingOp/Claim oscillations resulting from repeated transmission aborts have not been satisfactorily addressed.

SUMMARY OF THE INVENTION

RingOp/Claim oscillations due to duplicate addresses and transmit aborts are avoided by using token preserver frames to reset the TVX timer in a station.

The invention is an apparatus for a station in a communications network, the network of the type having a plurality of stations capable of transmitting frames onto the network, and the stations capable of detecting transmissions on the network, and the stations capable of taking predetermined action in the absence of detecting any frame transmission for a predetermined first time interval, and a first timer for measuring the predetermined first time interval. There is provided a means for originating information frames onto the network. There is further provided a timing means for measuring a second predetermined time interval, the second predetermined time interval being chosen to be less than the first predetermined time interval; and a reset means for transmitting a reset frame onto the network by a selected station at times in response to the timing means, and the reset frames being transmitted at intervals substantially equal to the second predetermined time interval, and the reset frames being capable of causing a station to reset the first timer to a begining value, the reset means capable of transmitting the reset frames between frames transmitted by the originating means.

The network may have a token controlled ring as a local area network, and the reset frame may be a token preserver frame.

The second selected time interval is chosen to address the duplicate address situation by a means for a first station to transmit a plurality of client frames onto the ring, and means for the first station to transmit the token preserver frame onto the ring between selected client frames, after which transmission of the client frames continues. Additionally, there is a means, responsive to a second station not detecting the client frames and responsive to the second station detecting the token preserver frame, for the second station to reset the TVX timer of the second station and avoid the second station taking the predetermined action in the absence of receipt by the second station of client frames transmitted by the first station.

The selected time interval is chosen sequential abortion of transmissions by means for transmitting the token preserver frame onto the ring communications system after abortion of a transmission, and before a subsequent transmission of a token.

BRIEF DESCRIPTION OF THE DRAWINGS

Turning now to the drawings, in which like numerals represent like parts in the several views.

DETAILED DESCRIPTION

Duplicate Address Situation

Figure 1A:
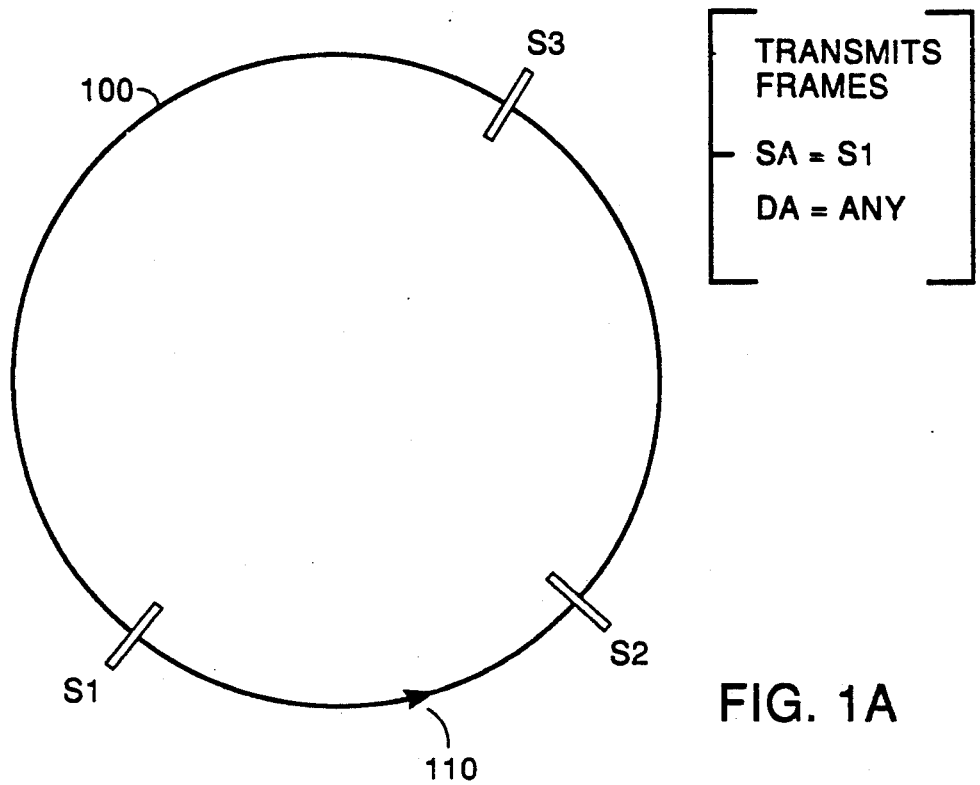
FIG. 1A is a schematic drawing of a ring communications system in accordance with the invention.

Stations make use of a unique station address, referred to as "my address", to identify the station. The station's unique my address is used for several purposes including stripping frames from a ring network, where the frames were transmitted onto the network by the station. A frame is stripped, or removed from the network, when the frame circumnavigates the ring network and arrives back at the station which transmitted the frame onto the ring network.

Additionally, the station's my address is used as a receiving address for the purpose of receiving frames detected on the network.

Stations also maintain "my address" and a list of address for the purpose of address stripping. For example, a station may use any one of many addresses as a source address in a frame that the station transmits onto a ring network. The station maintains a table, called the source address list or "SA list" for short, listing all addresses except the station's "my address", used in frames as source addresses. The SA list is maintained for the purpose of source address stripping the frame from the ring network after the frame circumnavigates the ring.

Additionally, the station may maintain a separate table for receipt of frames detected on the network called the destination address list, or "DA list" for short.

The distinction between the SA list used for address stripping and the DA list used for receipt of frames is further disclosed in the Appendix hereinbelow, and further, is disclosed in the following Applications for United States Patent:

DETECTION OF DUPLICATE ALIAS ADDRESSES, by H. S. Yang and J. D. Hutchison, Ser. No. 559,031, filed Sep. 30, 1990;

TESTING A COMMUNICATIONS NETWORK FOR DUPLICATE STATION ADDRESSES, by H. S. Yang, J. H. Hutchison, W. R. Hawe, and G. P. Koning, Ser. No. 555,861, filed Jul. 19, 1990, all disclosures of these documents are incorporated herein by reference.

As the result of a fault, a particular station may use an address as the source address of a transmitted frame, and the address is the same as the "my address" of another station on the network, or the address is in the SA list of another station on the network. This situation is referred to as a "duplicate address" situation, or duplicate address problem. The duplicate address may be, for example the "my address" of the particular station, or, for a further example, may be an address in the particular station's SA list of addresses.

For example, a software or hardware fault in a station may cause the fault. Or, for example, the station may be part of a bridge and the station's list of addresses contain addresses of stations on another local area network where the duplicate station is located. Or, for a further example, a human error in entering a station address may have resulted in a duplicate address on the network. The "duplicate address problem" includes the situation of having a duplicate station address on a single local area network, on connected local area networks, on wide area networks, or on any combination of connected communication networks.

In some cases the fault condition may destroy the operability of the network.

NETWORKS

FIG. 1A shows a communications ring 100 having stations S1, S2, and S3. Access to the ring 100 by a station for transmission of frames onto the ring is controlled by a token passing method, and token rotation occurs in the direction shown by arrow 110.

Each station has a unique address called "my address". The "my address" of the station is assigned in accordance with a standard procedure further disclosed in the Appendix.

Figure 1B:
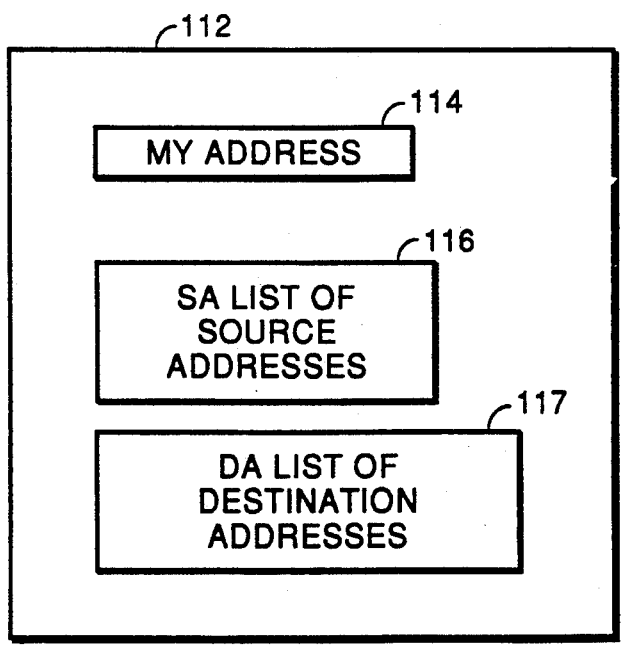
FIG. 1B is a block drawing of an address architecture in accordance with the invention.

FIG. 1B is a block diagram 112 showing the station's unique "my address" 114 and a list 116 of source addresses, referred to as an "SA list". For example, the block diagram 112 belongs to one particular station. However, there is a similar block diagram for each station and its "my address" and SA list of addresses. Also a DA list of destination addresses 117 is maintained by the station.

The my address and the SA list are used by the station for source address purposes. The principle source address purpose for which the station uses my address and the SA list is for source address stripping. For example, the station transmits a frame onto the ring with an address from it's SA list in the source address field of the frame. After the frame circumnavigates the ring communications system, the frame arrives at the transmitting station, and the transmitting station strips the frame based upon a match between an address in the station's SA list and the address in the source address field of the frame.

For example, the address in a station's SA list may be obtained from several sources. A first exemplary source of addresses placed in an SA list, for the SA list of a bridge, is from "my addresses" of stations from other LAN systems, and the station forwards frames from these other stations onto ring 100. For example, when a bridge forwards a frame onto a LAN, the source address of the frame contains the "my address" of the originating station, and the SA list of the bridge station also contains the "my address" of the originating station so that the forwarding bridge station will have information in order to perform source address stripping, thereby removing the frame from the LAN.

A second source of addresses in a station's SA list is the use by a station of one or more additional source addresses besides the station's "my address". The additional addresses are then placed in the SA list maintained by the station. However, the stations "my address" is not placed in the SA list maintained by the station. Examples of additional addresses used for frame transmission include multiple protocol stacks in a station, addresses used for network management, and so forth.

A third source of entries in a particular station's SA list are the various addresses used by various stations, where the particular station forwards frames transmitted by the various stations, and the forwarding is onto a new LAN. That is, if a station is in the business of forwarding frames onto a LAN from other LANs, then the forwarding station must have entries in it's SA list of all addresses used as source addresses by the various stations on other LANs. For example, the SA list of the particular station must have both all of the "my addresses" of stations in communication with the LAN, and all of the additional addresses used by the stations in communication with the LAN for source addresses which they place in the source address field of a transmitted frame. Accordingly, an SA list of a typical bridge station in a modern communications network may have tens of thousands of entries.

Figure 2A:
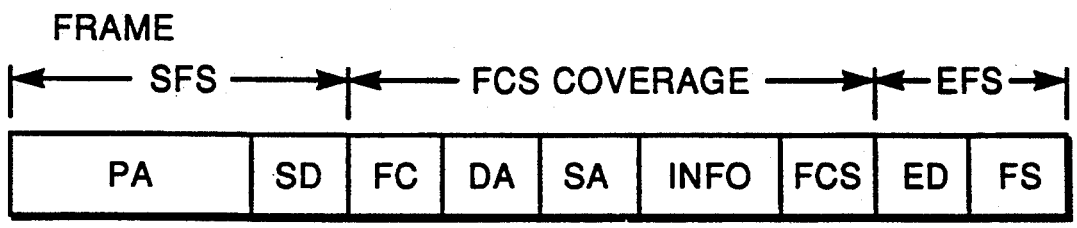
FIG. 2A is a diagram of frame field protocol.

FIG. 2A shows frame format as specified by the FDDI standard.

The "start of frame sequence" is indicated by SFS. SFS includes the PA field which is a preamble, and the SD field which is the start delimiter.

The FC field is the frame control field. The content of the FC frame determines the type of frame. For example, the FC field may designate the frame as an information frame, a claim frame, a beacon frame, etc.

The DA field is the destination address of the frame, and indicates the address of the station to which the frame is directed. Some addresses are single station addresses referred to as unicast or single addresses, some addresses may indicate a selected group of stations referred to as a multicast address, and still other addresses may indicate all stations on the communications network referred to as broadcast addresses.

The SA field is the source address of the frame, and indicates the address of the station which originated the frame.

The INFO field contains the information transmitted by the frame.

The FCS field contains the frame check sequence. The frame check sequence is a series of bits that are used in a cyclical redundancy check. The fields covered by the FCS are indicated by the arrow, and include FC, DA, SA, INFO, and FCS.

The end of frame sequence is indicated by EFS, and includes field ED the ending delimiter, and FS the frame status field.

Figure 2B:
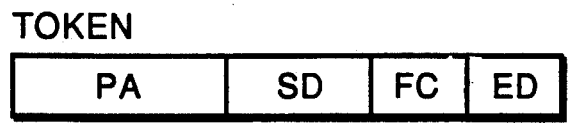
FIG. 2B is a diagram of a token.

Referring now to FIG. 2B, FIG. 2B shows the format for a token. The token contains the fields PA and SD which are in the start of frame sequence SFS, the FC field which contains a sequence of bits identifying the token as a token, and the ED ending delimiter field.

In some token passing protocols such as FDDI, it is required that a frame be stripped from the ring by the station having the station's "my address" matching the SA field of the frame, as in source address stripping as discussed hereinabove. Under normal operation this requirement means that the station that originated the frame strips the frame from the ring.

Referring to FIG. 1A, under normal operation, if station S1 captures the token thereby permitting station S1 to transmit frames onto the ring, then the frames transmitted by station S1 will have the SA field of the frame contain the address of station S1. The frame will circumnavigate the ring 100, will be received by any station having an address matching the DA field of the frame, and the frame will then be stripped from the ring by station S1 because the "my address" of station S1 matches the address in the SA field of the frame.

A transmitting station may transmit frames onto the ring having the SA field of the frame contain addresses other than the station's my address, and an example is a station in a bridge forwarding a frame onto the ring from another local area network. The SA field of the frame will contain an address placed there by the originating station. For example, the originating station may use its my address or may use another allowed address as the address placed in the SA field of the frame that the station originates. The transmitting station then makes use of it's SA list to strip the frame from the ring to which it was forwarded.

Accordingly, a frame which is forwarded from its originating station through several different LANs will always have in its source address field the address placed there by the originating station.

A failure mode of the ring may be examined by reference to FIG. 1A, and occurs by station S3 transmitting onto the ring a frame having the source address of the frame containing the address of station S1, that is SA=S1. Station S3 may transmit such a frame, by for example, station S3 being part of a bridge and forwarding the frame from another ring (not shown) onto ring 100. Station S1 206 will strip the frame from the ring, thereby preventing stations S2 and S3 from detecting the frame.

Ordinary operation of the ring provides that a station receive a valid frame or token within a specified timeout period. The timeout period is measured and detected by a timer, and this timer is referred to as the TVX timer. Typical values used in, for example the FDDI specification, are that the timeout period is approximately 2.6 milliseconds.

In the event that a station does not receive a frame within the timeout period, the station forces a ring fault recovery and ring initialization. In, for example, the FDDI specification, the timed out station begins transmitting claim frames, and thereby forces a claim process followed by the ring initialization. (The claim process and ring initialization for the FDDI specification is described hereinbelow in the Appendix.)

In the event that station S3 transmits frames stripped by S1 for a time period exceeding the timeout period, then station S2 and station S3 will have their timeout period expire, and these stations will force a ring fault recovery and ring initialization process. After the ring fault recovery and ring initialization process then station S3 continues to transmit frames stripped by station S1, and consequently stations S2 and S3 will again have their timeout period expire. Repeated cycles of fault recovery and ring initialization are referred to as RingOp/Claim oscillations.

Stated differently, RingOp/Claim oscillations occur because frames are transmitted onto the ring by a first station, and the frames erroneously have their SA field contain an address of a second station on the ring, the second station therefore strips the frames, and downstream stations have their timeout counter expire thereby causing the expiring stations to begin a ring recovery cycle. And RingOp/Claim oscillations are repeated occurrences of ring recovery cycles.

The invention has a transmitting station periodically transmit a special frame called a "token preserver" frame. For example, the token preserver frame may be transmitted between client frames during a TRANSMIT sequence. The token preserver frame is transmitted at time intervals less than the timeout period of the TVX timer. The effect of a token preserver frame is to reset the timeout timer of each station to a begining value, so that it begins counting its next timeout period.

In a first embodiment of the invention, the token preserver frame is not stripped by the offending station because the token preserver frame has no source address. That is, the station having the duplicate address of the originating station does not strip the token preserver frame because source address stripping does not occur for the token preserver frame.

In a second embodiment of the invention, the token preserver frame has the "my address" of the transmitting station placed in its source address field. Other techniques, outside of the scope of this invention, such as FDDI RMT and DAT, are used to detect the presence of any duplicate of the station's "my address" and the my address of another station on the same token ring, or the presence of the station's "my address" and an entry in any SA list maintained by another station on the same token ring. As a result of the FDDI RMT and DAT procedures, the transmitting station will "know" that it's "my address" is not duplicated, and therefore that the token preserver will not be stripped by source address stripping by another station. The station is required to place the my address of the station in the source address field of the token preserver frame, and the station is required to place no other address, such as an address taken from the SA list of the station, in the source address field of the token preserver frame. In this embodiment of the invention the token preserver frame resets TVX timers which would otherwise have expired due to an offending station having a duplicate between an entry in its source address list and an entry in the source address list of the transmitting station.

In a third embodiment of the invention, the token preserver frame of the second embodiment is used, where the token preserver frame has the "my address" of the transmitting station in the SA field of the frame. The duplication of addresses may occur between a source address in a station on a remote LAN and an SA list of a station on the local LAN. However, the transmitting station does not maintain an SA list, as for example the transmitting station may be a bridge which does not employ source address stripping. Procedures such as FDDI RMT and DAT are used so that the transmitting station will "know" that it's "my address" is not duplicated as in the second embodiment above. The token preserver frame will reset TVX timers which otherwise would have expired in the event that frames being forwarded onto the local LAN network by the transmitting station are duplicate address stripped, and downstream stations therefore detect no frames during a TVX timeout period (that is, an originating station on another LAN has a duplicate address on the local LAN).

Detection of a frame by a station resets the TVX timer of that station, for example, in the context of the FDDI MAC standard, in the event that any one of the following conditions are met:

1) a non-restricted token is detected. Tokens are normally non-restricted, however a station may gain control of the ring for a high priority communications session by creating a restricted token after capturing a non-restricted token. At the conclusion of the high priority session, the station transmits a non-restricted token. Non-restricted tokens are further discussed in the ANSI documents cited in the Appendix hereinbelow.

2) an ownerless void frame is detected.

3) any frame with a good FCS check and the E indicator is reset. The E indicator is an error indicator located in the frame status field FS as shown in FIG. 2A. Reset means that the E indicator indicates that the frame is error free.

4) an implementer frame with the E indicator reset, but there is no FCS check required.

5) a claim or beacon frame is detected.

Figure 3A:
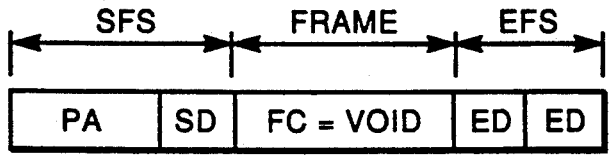
FIG. 3A is a diagram of a first exemplary token preserver frame in accordance with the invention.

FIG. 3A shows the fields of an exemplary token preserver frame. The frame shown in FIG. 3A is referred to as an "ownerless void" frame. The start of frame sequence SFS has the PA preamble and the SD starting delimiter. The frame has FC frame control set to a bit sequence that indicates that the frame is a VOID frame. The frame then has the end of frame sequence EFS containing the ED ending delimiter field and the FS frame status field. Since the "ownerless void" frame has no source address SA field it has no owner, and also it cannot be stripped by source address stripping. However, when a station detects the "ownerless void" frame the station will reset it's TVX timer to a begining value. The ownerless void frame may, for example, be stripped when it reaches a station that is transmitting.

Figure 3B:
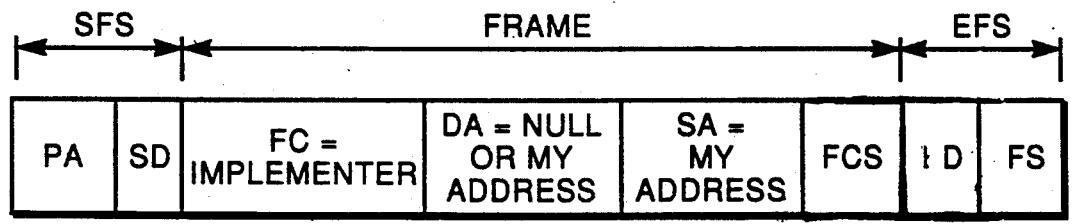
FIG. 3B is a diagram of a second exemplary token preserver frame in accordance with the invention.

FIG. 3B shows a second exemplary token preserver frame. The frame shown in FIG. 3B is referred to as an "implementer frame". Again, the implementer frame has the start of frame sequence SFS contain the fields PA and SD. The FC frame control field is set to a bit sequence designating "implementer". Stations detect the FC field and recognize that the frame is a special implementer's frame. The destination address field DA is set to null, in accordance with IEEE and ANSI standards. The SA source address field contains the "my address" of the transmitting station. The implementer frame resets the TVX timer of each station detecting the frame. The implementer frame is stripped by source address stripping by the station that transmitted it, after circumnavigating the ring. However, the implementer frame is not source address stripped by a station having an entry in its source address list that is duplicated in the source address list of the transmitting station, as the "my address" is not duplicated.

Figure 3C:
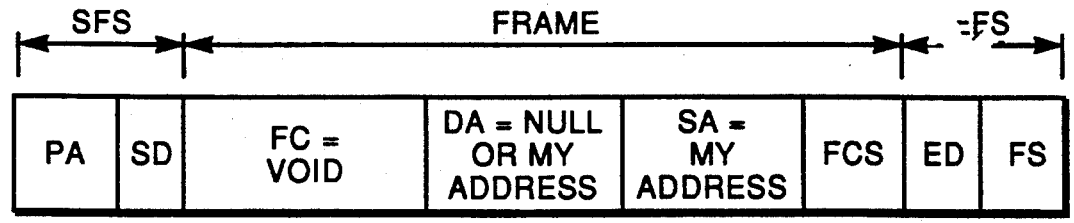
FIG. 3C is a diagram of a third exemplary token preserver frame in accordance with the invention.

FIG. 3C shows a third exemplary token preserver frame. The frame shown in FIG. 3C is referred to as a "well formed void frame". The "well formed void frame" again has the SFS start of frame sequence containing fields PA preamble and SD start delimiter. The frame control field FC is set to VOID. The DA destination address field is set to null or the my address of the transmitting station. There is a source address field SA, and SA is set to the my address of the transmitting station. The FCS field provides cyclical redundancy check, and the end of frame sequence EFS contains the ED ending delimiter and the FS frame status fields. The "well formed void frame" resets the TVX timer of each station detecting the frame. The well formed void frame is stripped by source address stripping by the station that transmitted it, after circumnavigating the ring. However, the well formed void frame is not source address stripped by a station having an entry in its source address list that is duplicated in the source address list of the transmitting station, as the "my address" is not duplicated.

In, for example, a ring operating according to the FDDI specification, the TVX timer will be set to a TVX interval. Periodic transmission of the token preserver frame at time intervals of approximately ⅔ (TVX interval) will avoid Ringop/Claim oscillations. If, as in the above example, the TVX interval is 2.6 milliseconds, then it is adequate to transmit token preserver frames every ⅔* 2.6 milliseconds, or approximately every 1.7 milliseconds.

Figure 4:
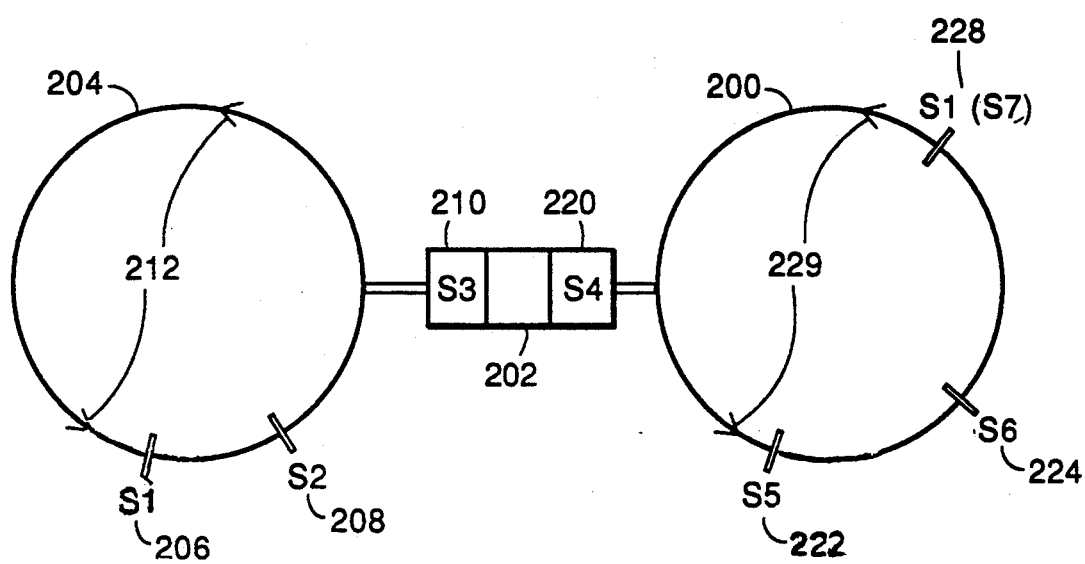
FIG. 4 is a diagram of a two ring communications network, where the LANs are connected by a bridge.

Referring now to FIG. 4, there is shown an example of the invention wherein a first local area network (LAN) 200 is connected by bridge 202 to a second local area network (LAN) 204.

LAN 204 has stations S1 206, S2 208, and S3 210. Token rotation occurs in the direction of arrows 212. Station S3 210 is the bridge 202 connection into LAN 204.

LAN 200 has stations S4 220, S5 222, S6 224, and S7 228. Station S4 220 is bridge 202 connection to LAN 200. Token rotation occurs in the direction of arrows 229.

Each station should have its "my address" set to a unique value. However, a fault exists in that the "my address" of station S1 228, not station S7 228, is identical to the "my address" of station S1 206. Station S1 228 is not shown as station S7 because: firstly, the station should have a unique address indicated by S7; secondly, because of the duplication of the address of station S1 206, the station cannot be distinguished from station S1 206, and so is referred to as station S1 228. Recognition of the fault at the station 228 is indicated by placing S7 in parenthesis (S7) in FIG. 4.

Next we trace the chain of events when station S1 228 attempts to transmit frames to station S2. First, station S1 228 captures the token rotating on LAN 200, thereby giving station S1 228 permission to transmit frames onto LAN 200. Station S1 228 then begins transmitting frames having the address of station S2 208 in the DA field of the frame, and the address of station S1 in the SA field of the frame. Station S4 220, through a forwarding table stored in bridge 202, recognizes that the frames having destination address DA set to station S2 208 must be forwarded to LAN 204. Accordingly, the frame is transferred to station S3 210 for forwarding. After station S3 210 captures the token circulating on LAN 204, station S3 210 transmits the frame onto LAN 204, where the frame has the destination address DA field containing the address of station S2 208, and the source address SA of the frame containing the address of station S1 228, which is identical to the the address of station S1 206.

Station S1 206 detects that the SA field of the frame is the "my address" of station S1 206, and so strips the frame from LAN 204. Accordingly, station S2 detects no frames. Also, station S3 detects no frames. In the absence of the invention stations S2 and S3 would have their TVX timer expire, and then stations S2 and S3 would initiate fault recovery and ring initialization, thereby eventually leading to RingOp/Claim oscillations. However, when station S3 210 uses the invention by transmitting a "token preserver" frame periodically as it transmits client frames, the token preserver frame escapes stripping by station S1 206. The token preserver frame is detected by station S2 208, and therefore causes station S2 208 to reset its TVX timer. Resetting the TVX timer of station S2 208 prevents RingOp/Claim oscillations.

It is noted that station S2 208 does not receive any of the frames intended for station S2 208, and so there is a communications failure. However, other stations on both LAN 200 and LAN 204 will continue to function normally.

The failure of station S1 228 to communicate with station S2 208 will typically be registered in an error record, and the failure can then be investigated later by the network manager. Various tools, not the subject of the present invention, can then be used by the network manager in order to learn the source of the failure of station S1 228 to communicate with station S2 208. The invention has avoided failure of LAN 204 through RingOp/Claim oscillations.

The frames transmitted onto LAN 200 by station S1 228 will be stripped from LAN 200 by station S1 228 after they circumnavigate the ring of LAN 200, as the source address field SA of the frames contains the same address as the "my address" of station S1 228, that is the "my address" of station S1 206. Accordingly, LAN 200 functions normally in the presence of the erroneous entry of the "my address" of station S1 228.

An effect of the token preserver frame is to prevent a station, which station is not receiving any frames because of stripping by an upstream station of frames having their SA field set to a duplicate address, from initiating a ring fault recovery and ring initialization process.

A further example of erroneous fault recovery and ring initialization occurs in the situation where a bridge forwards frames from a first LAN to a second LAN and the bridge station on the second LAN does not keep a SA list, and a station address on the first LAN is duplicated in the second LAN. The bridge does not keep track of the source address in the SA field of the frame being forwarded, and simply forwards the frame with the source address field containing the source address contained in the arriving frame. Of course, in this example, the forwarded frame must be removed from the second LAN by a stripping method other than source address stripping, as described hereinabove in the Background section. Again, in this example, the token preserver frame prevents a station, which station is not receiving any frames because of stripping by an upstream station of frames having their SA field set to a duplicate address, from initiating a ring fault recovery and ring initialization process.

Figure 5:
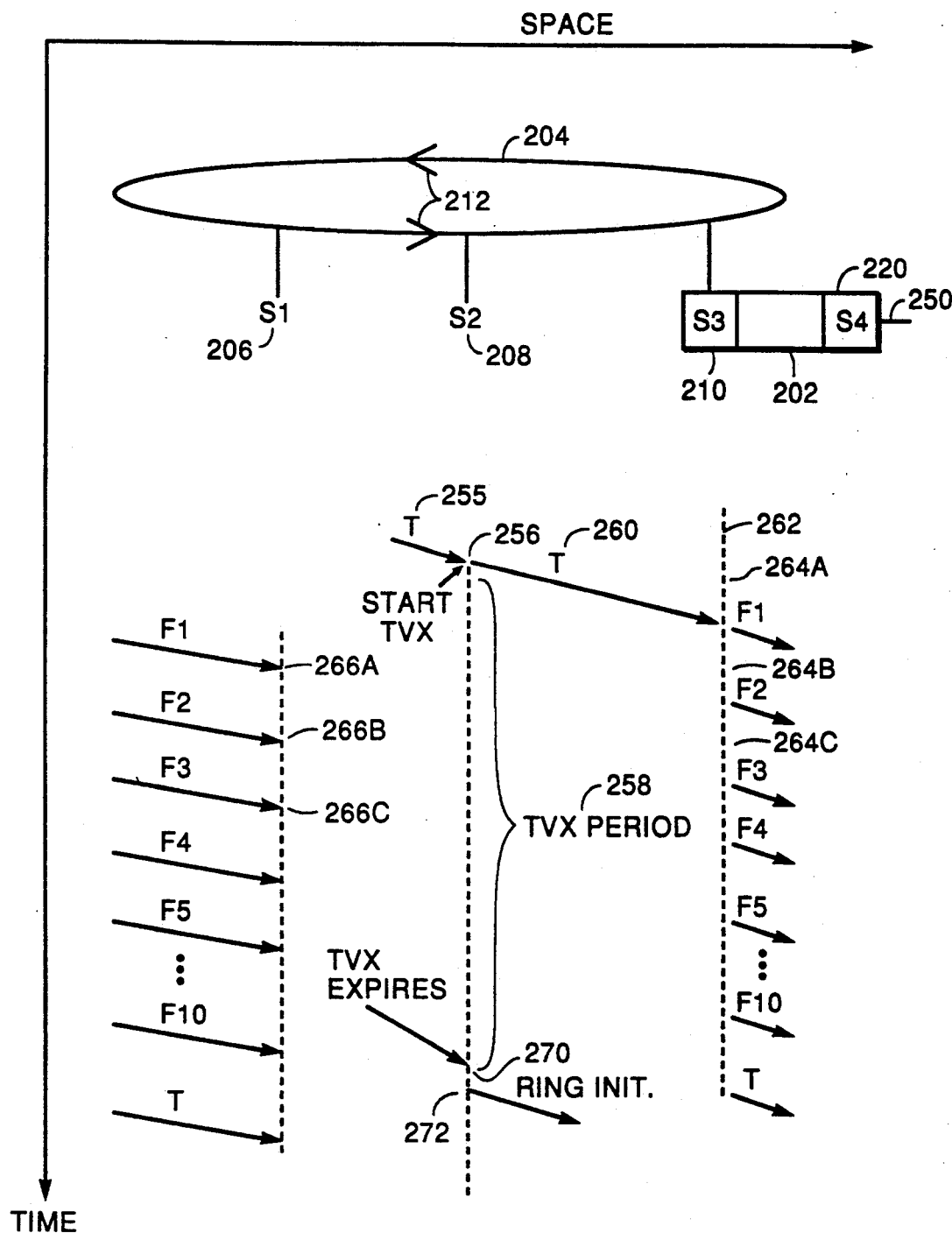
FIG. 5 is a space time diagram showing RingOp/Claim oscillations.

Referring now to FIG. 5, a space time diagram of LAN 204 is shown, and location 270 of the diagram illustrates false ring initialization in the absence of the invention. By way of exemplary illustration, FIG. 5 illustrates the LAN 204 shown in FIG. 4. However, it is to be understood by those skilled in the art that the space time diagram of FIG. 5 applies to any general local area network. For example, connection 250 from Station S4 is to another communications network, the other communications network could be a ring network as illustrated in FIG. 4, or for example, could be an Ethernet communications network using CMSA/CD bus arbitration, or for a further example, could be a long distance telephone connection to a wide area network, or could be a connection to any communications system.

Bridge 202 receives a number of frames at station S4, where the frames are addressed to station S2 208 by having the DA destination address of the frame containing the address of station S2 208, and, as a result of a duplicate address fault, having the SA source address of the frame containing the "my address" of station S1 206. For example, bridge 202 may store a sequence of frames in a memory internal to bridge 202, or, as a second example, may receive the frames sequentially through connection 250 to station S4 as it transmits them through station S3 onto LAN 204.

Token T 255 is detected by station S2 208 at time 256. In this illustration, station S2 does not have any frames to transmit onto the LAN 204 at this time, and so station S2 simply repeats the token, thereby transmitting token T 260 onto LAN 204. Also, at time 256, station S2 resets its TVX timer which begins running for a time equal to the TVX period 258.

Station S3 captures token T 260 at time 262. Station S3 begins transmission of frame F1 at time 264A. Station S1 206 strips frame F1 from LAN 204 at time 266A. Accordingly, station S2 neither detects nor receives frame F1.

At time 264B station S3 begins transmission of frame F2 onto LAN 204, and again at time 266B station S1 206 strips frame F2 from LAN 204. Accordingly station S2 neither detects nor receives frame F2.

At time 264C station S3 begins transmission of frame F3 onto LAN 204, again station S1 206 strips frame F3 from LAN 204, and again station S2 does not receive frame F3.

Finally, as illustrated in FIG. 5 by frame F10, station S2 208 fails to receive frames transmitted by station S3 for a sufficient length of time that the TVX timer of station S2 expires, as illustrated at time 270. Station S2 208 then at time 272 begins ring fault recovery and ring initialization.

Upon completion of fault recovery and ring initialization, LAN 204 once again becomes operational. In the event that station S3 210 continues to transmit frames having DA destination address field containing the address of station S2 208 and source address field containing the address of station S1 206, the TVX timer of station S2 208 will expire, and station S2 208 will once again begin ring fault recovery and ring initialization.

After the ring initialization is completed, station S3 may continue transmitting a stream of frames directed to station S2 208, and containing as the frame source address the address of station S1 206. Again, LAN 204 will be driven into ring fault recovery and ring initialization. Fault recovery and ring initialization sequences will continue in LAN 204 until station S3 210 quits transmitting frames having their destination address DA set to station S2 208, and source address set to station S1 206. It is this sequence of erroneous fault recovery and ring initialization that give rise to the term "RingOp/Claim oscillations".

Figure 6:
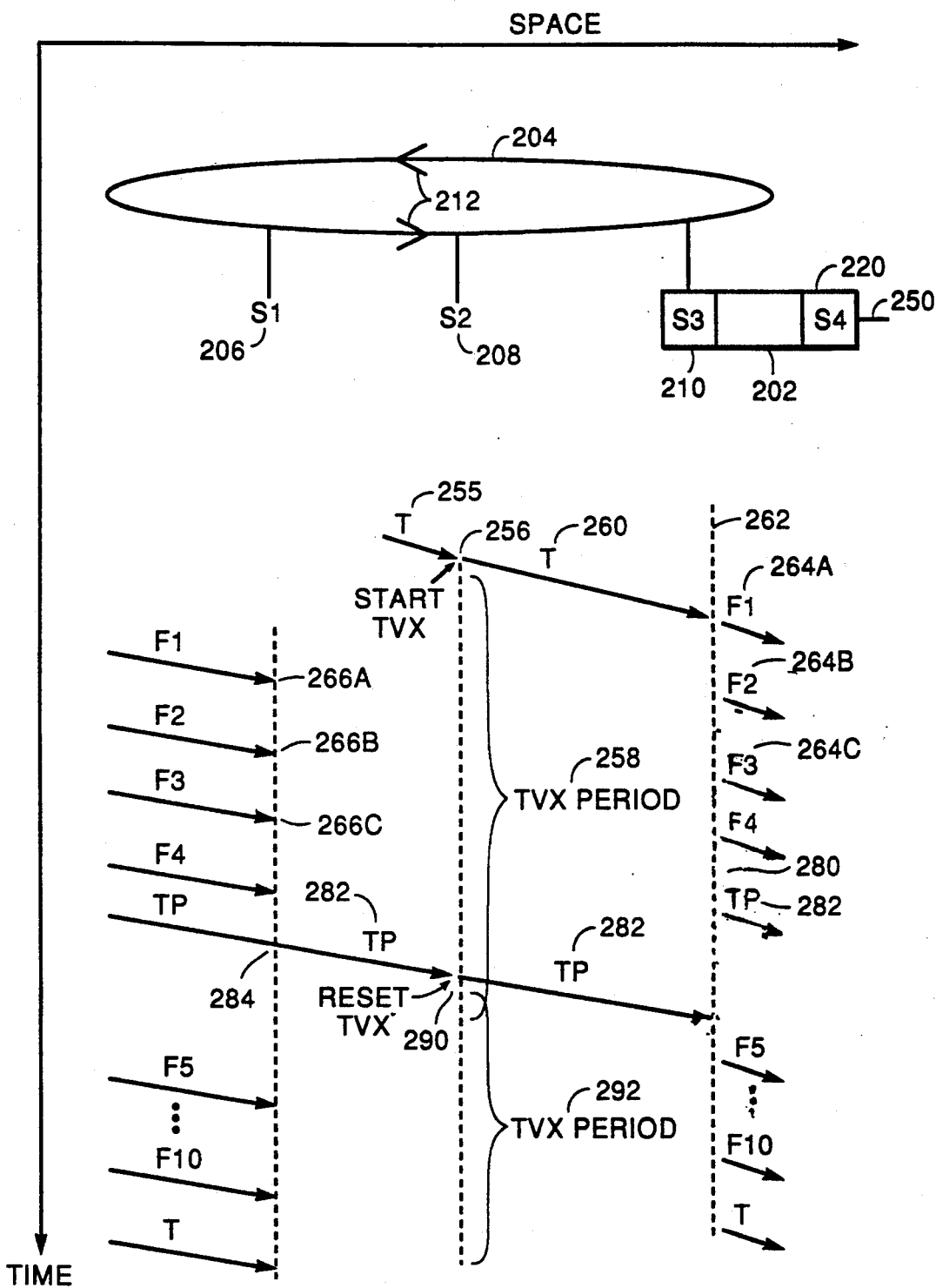
FIG. 6 is a space time diagram in accordance with the invention.

Referring now to FIG. 6, the invention is illustrated. Further, the invention is shown to prevent the RingOp/Claim oscillations illustrated in FIG. 5. At time 280 token preserver frame TP 282 is transmitted by station S3 210. Token preserver frame TP 282 reaches station S1 206 at time 284, where station S1 206 detects and repeats the token preserver frame 282. Station S1 206 repeats the token preserver frame TP 282.

Token preserver frame TP 282 reaches station S2 208 at time 290. At time 290 token preserver frame 282 causes the TVX timer of station S2 208 to be reset. The TVX timer then starts running for a new TVX period 292. Accordingly, station S2 208 does not initiate fault recovery and ring initialization as was illustrated in FIG. 5, and the invention is successful in preventing RingOp/Claim oscillations.

Station S2 208 also repeats the token preserver frame TP 282. Token preserver frame 282 continues around LAN 204 until it reaches station S3 210 where it may be removed by source address stripping. In the event that the token preserver frame is an ownerless void frame as in FIG. 3A, the token preserver frame will be stripped by methods other than source address stripping, for example when it encounters a station that is transmitting, or for example, by Frame Content Independent Stripping.

CONSECUTIVE ABORTS OF TRANSMISSIONS

Consecutive abortion of transmissions can result in RingOp/Claim oscillations. The invention teaches the transmission of a token preserver frame in the event of a transmission abort. The token preserver frame is detected by all downstream stations, and the detection of the token preserver frame results in resetting the TVX timer of each station detecting the token preserver frame. Resetting the TVX timer prevents the station from initiating RingOp/Claim oscillations.

As was mentioned hereinabove in the Background section, a number of conditions can lead to consecutive abortion of transmissions followed by RingOp/Claim oscillations, including:

1) A single station repeatedly aborts transmission of frames. The aborts may, for example, be due to internal station errors such as buffer errors. In aborting it's transmissions, the station fails to transmit a valid frame. Only fragments of a frame are transmitted onto the ring. Accordingly, downstream stations are unable to reset their TVX timers because they do not detect a valid frame. Therefore one or more of the downstream stations on the ring then timeout their TVX timers. Upon timeout of their TVX timers, the stations initiate RingOp/Claim oscillations.

2) A number of stations repeatedly abort transmission of frames, resulting in the absence of a valid frame to circumnavigate the ring for a TVX timeout interval. For example, a station captures the token and aborts its transmission without transmitting a valid frame, and then releases the token. The next station then captures the token and also aborts its transmission without transmitting a valid frame, and then releases the token. The same sequence of aborts is then repeated by successive stations. The net result is that stations further downstream from these stations will see "aborted frames" and nothing else. These stations have their TVX timers expire because they do not receive a valid frame or token. Upon timeout of their TVX timers these stations then initiate ring fault recovery and ring initialization. Repeated occurrences of similarly caused ring fault recovery and ring initialization cycles are then RingOp/Claim oscillations.

The invention has each station, as a part of its MAC level protocol, transmit a token preserver frame following an abort of a transmission, as is discussed in greater detail with reference to FIG. 7 hereinbelow. The token preserver frame then circumnavigates the communications ring, each station detects the token preserver frame, and so all stations on the ring reset their TVX timer. Resetting the TVX timers prevents any of the stations from initiating fault recovery and ring initialization, and so prevents RingOp/Claim oscillations.

No station strips the token preserver frame by source address stripping because: 1) the token preserver frame is an ownerless void frame as in FIG. 3A and is not subject to source address stripping; 2) is an implementer frame or is a well formed void frame as in FIG. 3B and FIG. 3C, and the my address of the transmitting station is unique in the local LAN.

TTRANSMIT FLOW PROCESS

Figure 7A:
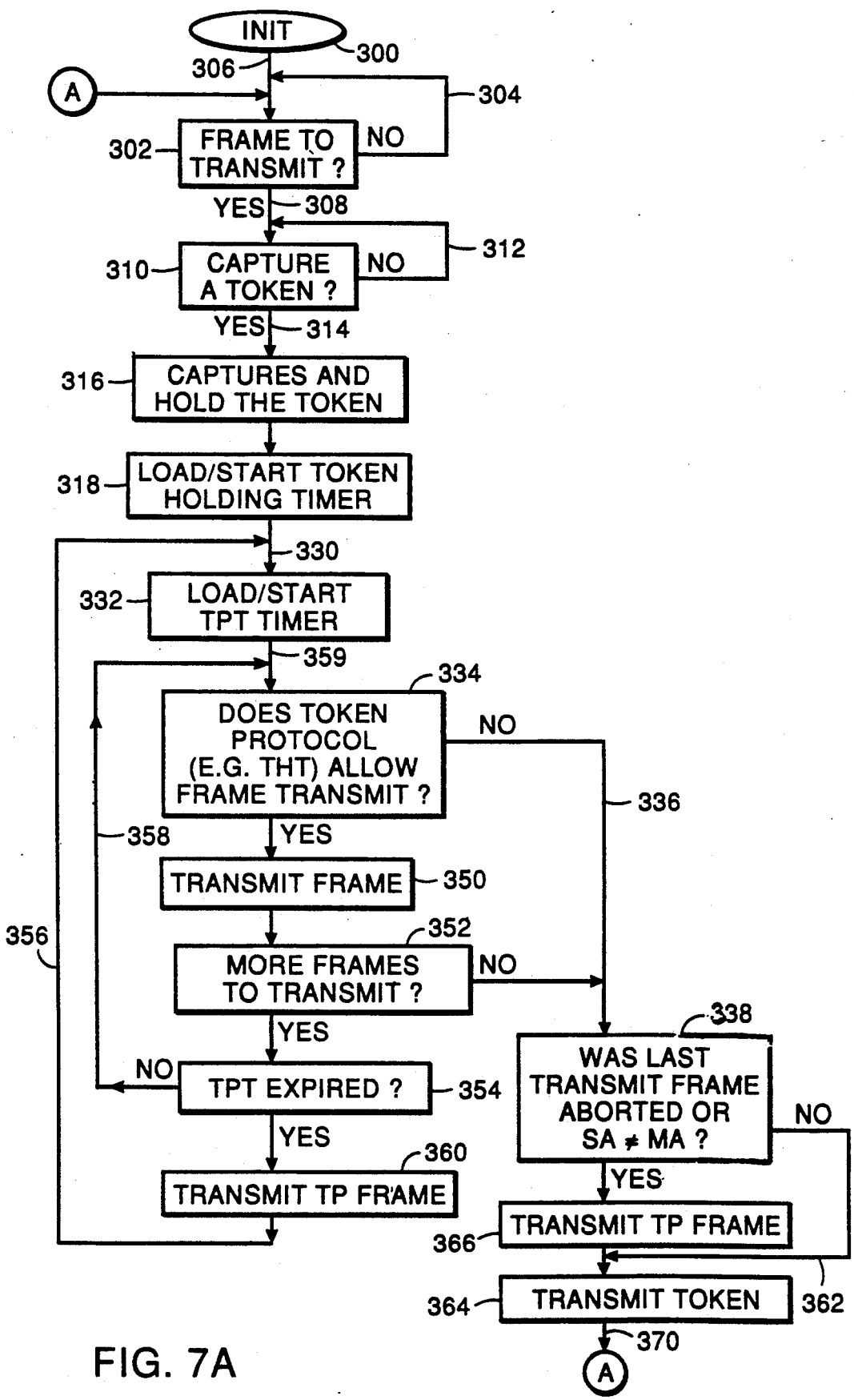
FIG. 7A is a flow chart for a transmit process in accordance with an embodiment of the invention.

Referring now to FIG. 7A, there is shown a transmitter process flow diagram in accordance with an embodiment of the invention. At block 300 the station transmit protocol is initiated and begins. At decision block 302 the process determines if there is a frame to transmit. In the event that there is no frame to transmit, the process returns along path 304 to point 306 in order to test the presence of a frame to transmit, and continues in this loop. In the alternate event that there is a frame to transmit, the process continues along branch 308 to decision block 310.

At decision block 310, the process tests whether or not the station captures a token. In the event that there is no token captured, the process proceeds along branch 312 to branch 308 in order to repeat the query as to whether or not a token is captured, and continues in this loop. In the alternate event that a token is captured, the process continues along branch 314 to block 316.

At block 316 the transmit process captures and holds the token. Upon completion of block 316, the process proceeds to block 318. At block 318 the process starts the token holding timer THT. Upon completion of block 318, the process proceeds to path 330.

From path 330, the process proceeds to block 332 and starts the Token Preserver Timer TPT. Upon completion of block 332, the process proceeds to decision block 334.

At decision block 334 the process determines if the token protocol, for example the token holding timer THT, allows transmission of the frame. In the event that transmission of the frame is not allowed, the process proceeds along path 336 to decision block 338. The action taken at decision block 338 and below will be further discussed hereinbelow. In the alternate event that a frame is allowed by the token protocol to be transmitted, the process continues to block 350.

At block 350 the frame is transmitted onto the LAN. Upon completion of block 350, the process continues to decision block 352 where the process determines whether or not there are more frames to transmit. In the event that there are no further frames to transmit the process continues along path 336 to decision block 338, to be further discussed hereinbelow. In the alternate event that there are more frames to transmit, the process continues to decision block 354.

At decision block 354 the process determines whether or not the Token Preserver Timer TPT has expired. In the event that the TPT timer has not expired, the process continues along path 358 to path 359 where where the action to transmit a frame is repeated, begining at block 334. In the alternate event that the TPT timer has expired the process continues to block 360.

At block 360 the process transmits a token preserver frame TP onto the LAN. The token preserver frame transmitted at block 360 prevents RingOp/Claim oscillations which would otherwise be caused by duplicate address problems in a source address stripping system. Upon completion of Block 360 the process continues along path 356 to path 330 where the action to transmit a frame is repeated, begining with block 330 where the token preserver timer TPT is reset.

The loops, from decision block 354 along path 358, or from block 360 along path 356 continue until all frames are transmitted at block 350, or until prevented from continuing due to the token protocol as decided at decision block 334.

Path 336, taken from either decision block 334 or decision block 352, leads to decision block 338. A two branch OR decision is made at decision block 338, and the decision is "yes" and a token preserver frame transmitted at block 366 if either branch is true.

At the first OR branch of decision block 338 the process determines whether or not the last transmitted frame was aborted. For example, an aborted frame may have no FCS field (FIG. 2A, FIG. 3B, FIG. 3C) transmitted, where a FCS field is expected from detection of the content of the FC field. In the event that the last frame was not aborted, the process continues within block 338 to the second OR branch. In the alternate event that the last transmitted frame was an aborted frame, the process continues to block 366.

At the second OR branch of decision block 338 the process determines whether or not the source address SA of the last frame was unequal to the "my address", MA, of the station. In the event that the frame source address is unequal to the "my address" of the station, then the process goes to block 366 and transmits a token preserver frame. In the alternate event that the frame was not aborted and the source address of the last transmitted frame was equal to the station "my address", then the process branches to block 364 along path 362 and transmits a token. For example, in a bridge a forwarded frame will have the frame source address SA unequal to the station "my address", and the decision of block 338 will be to transmit a token preserver frame. However, in the exemplary case where a bridge implements Frame Content Independent Stripping, there will be appended to the forwarded frames a stripping frame having it's source address field SA equal to the station "my address", and in this case block 338 will branch along path 362 to block 364 where the process transmits a token.

At block 366 the process transmits a token preserver frame onto the LAN. The token preserver frame transmitted at block 366 prevents timeout of TVX timers in downstream stations, and thereby prevents RingOp/Claim oscillations which may be caused by repeated aborts of transmissions, either by a single station or by a sequence of stations. Upon completion of block 366 the process continues to block 364.

At block 364 the process transmits a token onto the LAN, as it did when block 364 was reached through path 362. Upon completion of block 364 the station takes path 370 to point A where the process joins path 306 in order to loop back to the begining of the transmit process.

Figure 7B:
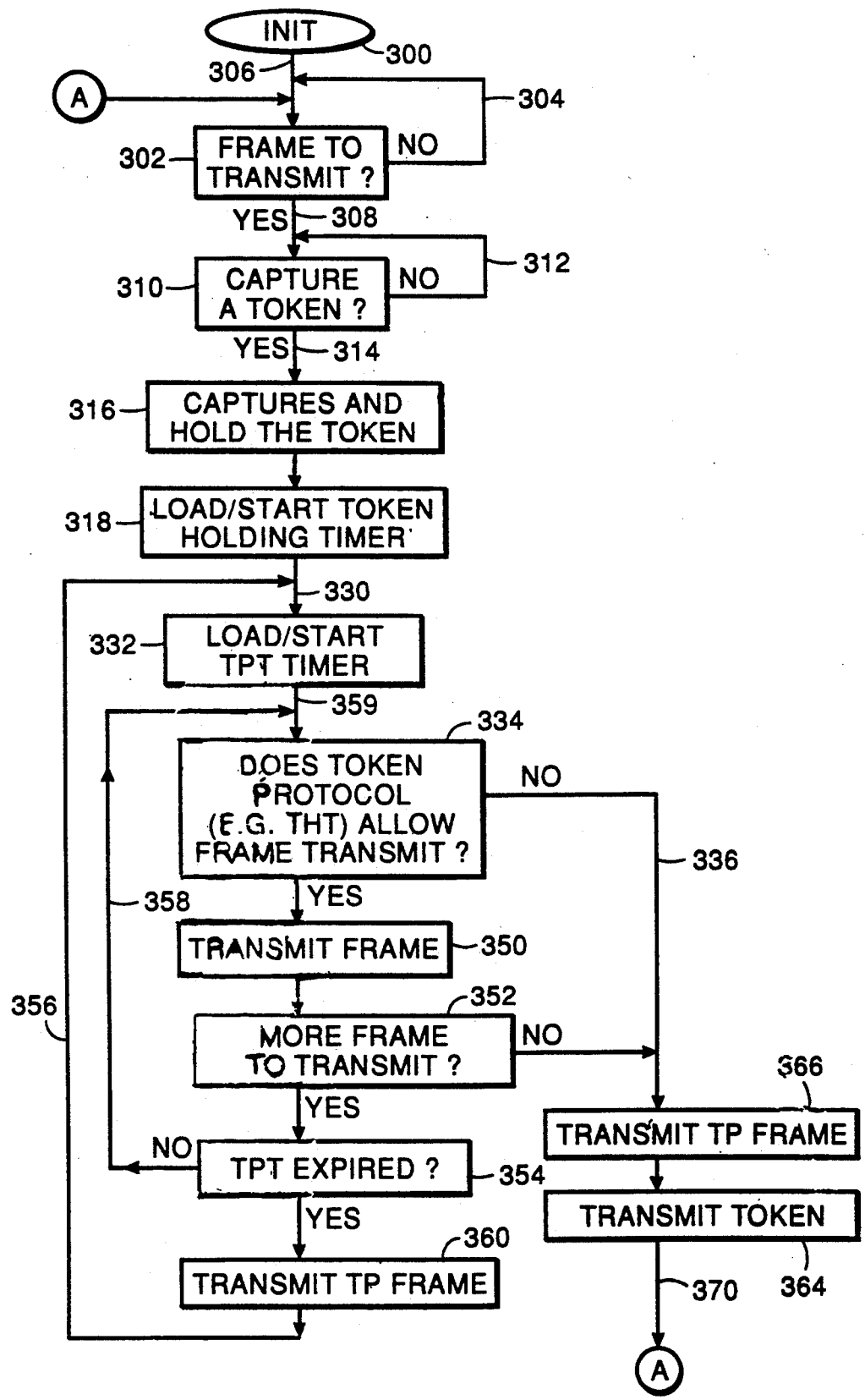
FIG. 7B is a flow chart for a transmit process in accordance with an embodiment of the invention.

Referring now to FIG. 7B, there is shown an alternative embodiment of the invention. The difference between the FIG. 7A and FIG. 7B embodiments of the invention occurs at path 336. In FIG. 7B path 336 proceeds directly to block 366, where the process transmits a token preserver frame. After transmitting the token preserver frame the process then proceeds to block 364 where the process transmits a token. The embodiment of the invention shown in FIG. 7B is advantageous in the exemplary embodiment of the invention where it is desired to transmit a token preserver frame before each transmission of a token.

EXEMPLARY FAULT CONDITIONS

The invention prevents a number of different but related fault conditions from initiating a ring fault recovery and ring initialization process. Examples of fault conditions prevented by the invention from causing a ring fault recovery and ring initialization process are discussed with reference to FIG. 8A, FIG. 8B, and FIG. 4.

Figure 8A:
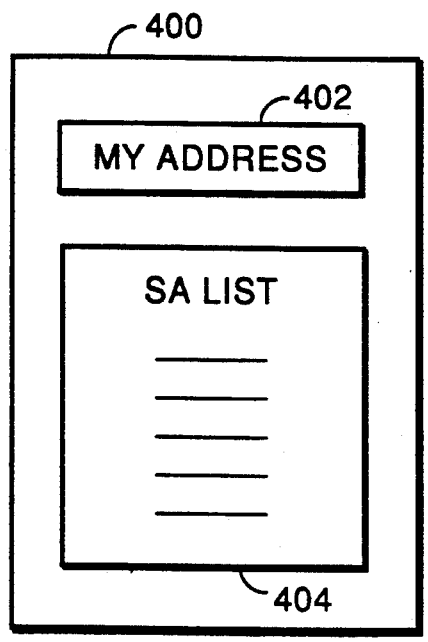
FIG. 8A-8B are is a block drawing of an address architecture for a selected station and for other stations in accordance with the invention.
Figure 8B:
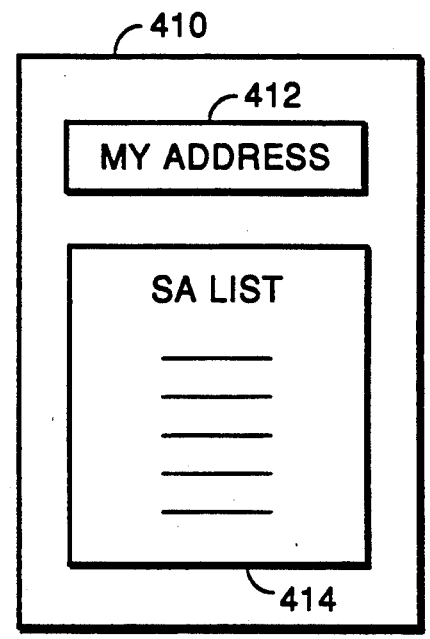

FIG. 8A refers to a selected station, and shows block diagram 400 holding the "my address" 402 of the selected station station and the SA list of address 404 of the selected station. FIG. 8B is block diagram 410 and refers to all other stations in communication with the selected station, and shows the "my address" 412 of each of the other stations and the SA list 414 of the other stations.

A first exemplary fault condition is the situation where a single ring, such as ring 204 of FIG. 4, has a selected station, such as station S1 206 and station S2 208 having the same "my address". This first exemplary fault condition is, in the preferred embodiment of the present invention, best detected and corrected by a process outside of the present invention. For example, the FDDI RMT and DAT process, or as a further example, a technique mentioned hereinabove as the subject of a US patent application, is expected to handle this exemplary fault condition. However, the present invention could use the ownerless void frame of FIG. 3A as a token preserver because it will not be source address stripped, and thereby avoid ring fault recovery and ring initialization process from resulting from this first exemplary fault condition. A disadvantage of using the ownerless void frame of FIG. 3A as a token preserver is that it cannot be stripped by source address stripping since the frame contains no source address field. Other stripping techniques must be used to strip the ownerless void frame, for example, Frame Content Independent Stripping, as discussed hereinabove.

A second exemplary fault condition is the situation where the selected station "my address" 402 is duplicated in the SA list 414 of another station on the same ring. For example, the my address of station S1 206 could be duplicated in the SA list of station S2 208 on ring 204. Again, in a preferred embodiment of the present invention, this fault condition is detected by methods outside of the present invention such as FDDI RMT and DAT methods, or the methods disclosed in US patent applications disclosed hereinabove. However, again the ownerless void frame of FIG. 3A could be used as a token preserver because it will not be source address stripped. Again, however, the disadvantage of using the ownerless void frame as a token preserver is that source address stripping will not remove the frame from the ring, and other methods of stripping such as Frame Content Independent Stripping must be used to remove the frame from the ring.

A third exemplary fault condition is where, with station S1 206 on ring 204 still being the selected station, the "my address" of station S6 224 on ring 200 is duplicated in the SA list 404 of the selected station S1 206 on ring 204. Accordingly, the SA list 414 of station S3 210 will have an entry of the my address of station S6 224, and so will duplicate an address in the SA list 404 of the selected station S1 206. That is, there is a duplicate in two SA lists, one SA list 404 in the selected station, and the other duplicate in a SA list 414 of another station on the ring. The present invention will avoid ring fault recovery and ring initialization process from occurring as a result of this third exemplary fault condition. In a preferred embodiment of the present invention, either an implementer frame of FIG. 3B or a well formed void frame of FIG. 3C may serve as the token preserver frame. The use of the well formed void frame of FIG. 3C is preferred over the use of the implementer frame because the well formed VOID frame can be source addressed stripped and so is more suitable for a standard MAC protocol. Both the implementer frame of FIG. 3B and the well formed void frame of FIG. 3C will be advantageously stripped from the ring by source address stripping. Again, the ownerless void frame of FIG. 3A could serve as a token preserver, but must be removed from the ring by stripping techniques other than source address stripping.

A fourth exemplary fault condition is where the my address of a station on a first ring is duplicated either in the my address or in the SA list of a station on a second ring, and the rings communicate through a bridge, but the bridge does not keep a SA list. For example, the my address of station S6 224 on ring 200 is duplicated by either the selected station S1 206 on ring 204 in its my address 402 or in its SA list 404. However, in this fourth exemplary example, the bridge 202 station S3 210 has no SA list. The bridge simply forwards frames from ring 200 onto ring 204 without keeping track of the source address field of the forwarded frame. (Of course, in this example, the forwarded frame must be removed from ring 204 by a stripping method other than source address stripping such as, for example, Frame Content Independent Stripping, as discussed hereinabove in the Background section.) The present invention prevents ring fault recovery and ring initialization process from occurring as a result of the fourth exemplary fault condition. As station S3 210 of bridge 202 transmits client frames onto ring 204, it practices the present invention by transmitting token preserver frames in accordance with an internal timer and a transmit process as shown in the flow chart of FIG. 7. And the token preserver frames prevent false ring fault recovery and ring initialization process from occurring.

APPENDIX

Computer Networks

A network of computers using a common medium for exchange of frames between stations of the network must have some means for deciding which station has access to transmit a frame onto the medium.

One method to control access to the medium is to connect the stations in a logical ring, and to use a token passing protocol to control access to transmit frames on the medium. The medium, the connection into a logical ring, and the stations connected to the medium are referred to as the "ring". An example of a well known token passing protocol is: to have a token, the token is held by a station, and the station holding the token is granted access to transmit on the ring, and after transmitting a last frame on the ring the station passes the token to the next station, and so the token passes around the ring. Also, it is common to require a station transmitting onto the ring to strip from the ring the frames that it transmitted, and for the transmitting station to hold the token until the last frame transmitted by that station returns from around the ring to the transmitting station so that all transmitted frames are accounted for and stripped, and then for the transmitting station to pass the token to the next station. By requiring the station to hold the token until the last transmitted frame returns from around the ring insures that stripping of frames from the ring proceeds appropriately.

The large bandwidth of medium to high speed token ring networks such as, for example IEEE 802.5 and FDDI communications systems, makes the requirement that a station hold the token until the last transmitted frame returns from around the ring too wasteful of ring bandwidth. Accordingly, in an optical fiber communications system connected in a logical ring it is reasonable to introduce a token passing protocol that permits a transmitting station to send the token on to the next station after transmitting a last frame, and not to waste the time required for the last frame to circumnavigate the ring before sending the token on to the next station.

However, stripping of frames from the ring must be handled efficiently by the token passing protocol. For example, the IEEE 802.5 token ring has the station transmitting frames strip its own frames from the ring, and the protocol uses a "last frame bit" in the last frame of a multiple frame transmission, or the only frame of a single frame transmission, to indicate to the station that stripping is complete.

The FDDI communications system uses source address stripping. The FDDI system is described in a number of documents produced by the American National Standards Institute (hereinafter ANSI), including: "FDDI Station Management," ANSI/IEEE X3T9/90-078, X3T9.5/84-49, Rev. 6.2, May 18, 1990; "Fiber Distributed Data Interface (FDDI)—Token Ring Media Access Control (MAC)", ANSI/IEEE X3.139-1987; and the physical layer specification is discussed in "ANSI/IEEE standard ANSI X3.148-1988". Station Management, SMT, and Duplicate Address Test, DAT, are discussed in ANSI/FDDI Station Management (SMT) draft proposed X3T9/90-078, X3T9.5/84/49 Revision 6.2, dated 18 May 1990. The FDDI network is a ring geometry controlled by a token. Capture of the token by a station permits the station to transmit.

Source address stripping used by the FDDI communications system makes use the source address field SA in a frame. Stripping of frames from the ring proceeds by having each station check all frames detected on the ring, and for each station to strip those frames having the source address field of the frame, SA, correspond to the address of the station.

Source address stripping works well so long as each station has a unique address. In the event that two stations have the same address, the "duplicate address problem", then source address stripping may lead to operational problems with the ring.

STATION ADDRESSES

A key feature of Local Area Networks, LAN, and Wide Area Networks, WAN, communications systems is that each station on the network has at least one unique address, and may have several unique addresses. The address is normally used in a MAC layer, of the seven layer ISO communications model, in order to provide an address function of the station.

Various well known LAN communications systems are expected to work together through bridges, etc, and so must have unique station addresses, and include: the IEEE 802 family of protocols, including IEEE 802.3 ETHERNET also known as Carrier Sense Multiple Access/Collision Detect CSMA/CD, IEEE 802.4 Token Bus, and IEEE 802.5 Token Ring; the Fiber Distributed Data Interface FDDI token ring, etc.

Administration of the addresses assignment is partly handled by the Institute of Electrical and Electronic Engineers (hereinafter IEEE), New York, New York. The address space may, for example, be a 48 bit address space. The address space may be broken into sub-address spaces. For example, administration of the addresses is broken into two 47 bit address spaces, a Globally Unique address space and a Locally Administered address space. Each address space has $2^{**}47$ addresses. Other sub-address spaces may be defined, for example, there may be an individual station address space and a group address space wherein groups of stations may be identified.

The IEEE handles administration of the Globally Unique address space. The IEEE assigns blocks of addresses to each manufacturer of terminal equipment. The manufacturer then is responsible for assigning a unique individual address from its assigned block of addresses into each station that is manufactured. Each manufacturer then provides a means for the station to "know" its address whenever the station is active on the network. And this means usually provides an automatic assignment of the address to the MAC layer of the station in order to minimize errors in the 48 bit address.

The stations interconnected into networks may be made by many different manufacturers. Conceptually, all stations ever manufactured, by all different manufacturers, must be capable of operating on one communications network. This concept is necessary because it is never known which subset of stations will be connected into a particular combination of local area networks and wide area networks. The administration of the Globally Unique address space addresses by the IEEE is supposed to help insure that each new manufactured station will have a unique address so that global interconnection is possible. Also the administration of the Locally Administered address space by network users, managers or owners is also supposed to insure unique addresses.

The Locally Administered address space is managed by either users or address administrators for various networks, organizations, etc. Addresses from the Locally Administered address space are typically handled manually and so are prone to human error.

A frame contains a destination address field DA which identifies the intended receiver station of the frame, or receivers when a group destination address is specified. Also, the frame contains a source address field SA which identifies the transmitter station of the frame.

The source address and destination address of a frame are detected by a station, and are used by the station for a variety of purposes. The most basic purpose is for detecting frames addressed to the station. Addresses may be used for other purposes such as source address stripping. Additionally, a station may use a frame, including the source address of the frame in ring fault recovery and ring initialization protocols. Also, a station may utilize a plurality of addresses for a variety of purposes. Examples of the use of a plurality addresses include: separate addresses for different protocol stacks in a station; as a forwarding table in a bridge; and, by a station for network management purposes, etc.

Address Detection

A content addressable memory (CAM) may be used for rapid comparison the source addresses in a frame with a table of addresses in a station. For example, a bridge station on a FDDI ring network must forward frames addressed to a station on an interconnected LAN, and such a station may use a CAM to aid comparison of a source address, SA, in a frame with addresses maintained in the bridge station address list.

FDDI Normal Ring Recovery and Initialization

A station begins emitting beacon frames, or "beaconing" as a result of, for example, some ring disruption, timeout of a timer, etc. Beaconing is a first step in ring recovery. Emitting claim frames, or "claiming" is the second step in ring recovery. Ring recovery normally proceeds as follows:

A. A station which is beaconing continues to do so until:
 1. it receives another station's beacon frame, at which time it repeats the other beacon;
 2. it receives its own beacon, at which time it begins to emit claim frames.
B. A station emits claim frames until:
 1. it receives a beacon frame from another station, at which time it repeats the beacon;
 2. it receives a claim frame from another station, and then it either continues to emit its own claim frame or begins repeating the other station's claim frame, according to a set of rules;
C. a station quits claiming when it:
 1. receives a claim frame with precedence, according to the rules, and then begins repeating the claim frame with precedence;
 2. receives its own claim frame, at which time the station makes a token.

The simplest set of rules for determining whether a station, upon receiving a claim frame, either copies the received claim frame or emits it's own claim frame is to determine precedence on the basis of the numerical value of the station address. For example, in token ring networks, it is a common practice for the claim frame having the source address SA field having the largest value to have precedence. And so the receiving station copies the received claim frame if the SA field of the received frame is larger than the address of the station, and if the SA field of the received frame is smaller than the station address then the station emits its own claim frame. This simple rule, leads in normal operation, to the station having the largest value of address to make the token.

Duplicate Addresses

It is possible, and almost inevitable, that mistakes in address assignment will be made as many tens of thousands of stations are interconnected. Somewhere someone will enter a wrong address into a station, and two stations will have the same address. For example, an address may be 48 bits long, making $(2^{**}48)$ or $2.8^*(10^{**}14)$ possible addresses. If a worker enters a 1 or a 0 wrong in the 48 bit string in loading an address, then two stations may have the same address. And all approximately $2.8^*(10^{**}14)$ addresses must be capable of operating on one FDDI network because it is unknown what subset will actually be connected into any particular network. A very severe address quality control problem exists in the Locally Administered Address assignments, because manual entry of the bits of the address is permitted.

An even further complication arises because a station may utilize a table of addresses. A particular example is a bridge. A bridge may, for example, join a first FDDI ring with a second FDDI ring. The bridge is specific equipment having a first station on the first ring and a second station on the second ring. The bridge must have a table of addresses listing the stations to which the bridge forwards frames. For example, the bridge first station on the first ring must have a list of addresses of all stations on the second ring so that it forwards frames on the first ring on to the second ring. Likewise, the second station of the bridge on the second ring must have an address list listing all stations on the first ring so that it can forward frames from the second ring on to the first ring. Also, a bridge may connect an FDDI ring with, for example, an ETHERNET network, or a token bus network, or a IEEE 802.5 token ring network, and also must buffer these incompatible protocols.

Ring Disruption by Duplicate Addresses

Severe disruption of the FDDI communications system may occur when two stations have the same address, or a duplicate address occurs in an address list. The disruption occurs because each station uses the source address, SA, in a frame to take action. Actions taken by a station, based on the source address in a frame matching an address in an address list includes, for example, receipt of the frame, stripping of the frame, and ring recovery and initialization protocol steps.

A station, in doing source address stripping, strips all frames having the source address, SA, of the frame matching any address in the station, including all addresses in the address list of the station.

In the Beaconing step each station tests the continuity of the ring by emitting a "Beacon" frame, and then stripping its "own" frame off the ring. The station identifies its "own" frame by reading the source address SA in the frame header. And if two stations have the same address then each will strip the other's Beacon frames from the ring, thereby interfering with the initialization process. Also, if a station has an address list containing a duplicate address, and the table is used for source address stripping, it will strip the other station's beacon frames from the ring.

However, the "Beacon" process may complete with two stations having duplicate addresses by the two stations stripping each other's Beacon frame and not detecting the duplicate address situation.

After a station removes it's "own" Beacon frame, the station begins the "Claim" process in order to determine which station issues the first token. The Claim process proceeds by each station issuing a "Claim" frame and reading all other Claim frames from the other stations, as set forth hereinabove.

The ring can fail to recover and initialize by a station emitting a token as a result of a duplicate address.

An example of a ring failing to recover as a result of a duplicate address situation is given as follows: two stations have the same address; both of the stations begin beaconing; the first station receives its "own" beacon frame from the second station, and begins claiming; the second station receives the claim frame from the first station, ignores the claim frame since it is beaconing, and continues to emit beacon frames; the first station again receives its "own" beacon frame from the second station, continues to claim, and the system is stuck and no token can be made. This condition is called "Claim Beacon Deadlock". Claim beacon deadlock can also occur if one station has the address of another station in an address list.

The rules for claim frame precedence for the FDDI ANSI standard ring are more complex than the above example, and are as follows. Each Claim frame has two operative parts, a first part called "Target Token Rotation Time" (hereinafter TTRT), and a second part consisting of the station address. The TTRT is a value given to the MAC layer by higher layers, and is a value that the higher layers have determined would be a useful value for that particular station considering its frame loading, etc.

In arbitrating for the right to issue a first token, the station bidding the smallest value of TTRT wins the right to issue the first token, and all stations have their Token Rotation Timers (hereinafter TRT) set to the winning TTRT value. The Token Rotation Timer value TRT is the maximum length of time that a station may hold a token during transmission.

In the event that two stations bid the same value of TTRT, the bidding is decided on the basis of the length of the address and then on the basis of the value of the address. Winning of the arbitration for the right to issue the first token is determined by the following three rules:

1. The bid with the lowest Target Token Rotation Time (TTRT) has precedence (i.e. the numerically lowest bid value for TTRT.

2. Given equal TTRT values in bidding, the bid with the largest address has precedence, (that is, a station with a 48 bit address wins over a station with a 16 bit address);

3. Given equal bid values for TTRT and equal address lengths, the bid with the highest address has precedence (i.e., the numerically highest address).

The principal bidding in the claim process is on the basis of the value of the station address. Although in FDDI the stations bid for TTRT in order to determine which station will issue the first token, in many other token controlled communications systems the value of TRT is fixed and the bidding for the station to create the first token is based entirely on the value of the station address.

The duplicate address problem in the FDDI system is particularly severe when the winning bid in the Claim process is by two stations having numerically identical addresses. If the two duplicates have bid different values for TTRT, one duplicate will have the winning bid value of TTRT. Each station strips the other's Claim frames. The station with the winning TTRT will never receive its Claim frames containing the winning bid TTRT value, and so a token will never be issued. Thus, the FDDI Ring will never become operational.

A duplicate address situation causes further problems if the two duplicates have the same bid value for TTRT, as both stations will "win" the Claiming process. Accordingly, both stations will start transmitting "Claim" frames. A first duplicate station will receive the Claim frame from it's duplicate and will issue a token. The second duplicate station may receive a complete Claim frame and issue a second token, making two tokens circulating on the FDDI ring. Two tokens on the ring is an error condition, but may not be fatal to the ring because if a station receives a token during transmission of frames, it simple strips the token and does not repeat it. Alternatively, the second duplicate station may receive a token before it transmits a complete Claim frame, and so the second duplicate station will detect an error condition and therefore commence an initialization of the FDDI ring. Again, the FDDI ring repeatadly initializes rather than enters stable operation.

In addition to the duplicate address problem being introduced by two stations on the ring having the same address, a station may maintain a table of addresses, as described hereinabove. Accordingly, if an address in the address list is numerically the same as any address of a station in the FDDI network, or in an table in any second station on the FDDI network, then the FDDI network may fail to initialize to stable operation as described above. With the interconnection of computer networks having addresses of, for example 48 bits in length, as many as $2.8*(10**14)$ stations may be connected together. And if any two of these stations has the same address, then the FDDI network may fail to function.

Solutions to Duplicate Address Problem

The duplicate address problem has been addressed in the publication "FDDI Ring Management", K. B. Ocheltree and R. F. Montalvo, at the IEEE 14'th conference on Local Computer Networks, October 1989 in Minneapolis, Minn.; and in the document "Research Report, FDDI Duplicate Address Problems", by K. B. Ocheltree, IBM Research Division, Yorktown Heights, N.Y., (no publication date).

These publications point out that it is necessary to detect that a duplicate address problem exists. The publications mention four conditions that are indicative of the existence of a duplicate address problem.

1. A first station receiving its "own" Beacon while Claiming for longer than the maximum delay of the FDDI ring. This condition indicates that another duplicate is Beaconing and the first station is Claiming.

2. A first station receiving it's own Claim frame while Beaconing for longer than maximum delay of the FDDI ring. This condition indicates that another duplicate is Claiming while the station is Beaconing.

3. A first station Receiving it's own Claim frame while not Claiming. This condition indicates that both duplicates have the same winning bid of Target Token Rotation Time (TTRT) and address combination. The first station has stopped Claiming and issued a token, while the other duplicate station continues to Claim.

4. A first station receiving valid Claim Frames with it's "own" address and different bid value for TTRT. This condition indicates duplicates with different TTRT values are both Claiming.

These four conditions are included in "FDDI Station Management SMT" Rev. 6.2 mentioned hereinabove as a standard Ring Management Technique (hereinafter RMT). An examination of these conditions shows that they require a protocol to carry out the test steps in Beacon or Claim frame passing through a station, where the protocol is performed by software or speciality hardware.

As a further example, RMT has no cyclical redundancy check, CRC. And so to prevent data errors from being mistaken for duplicate addresses, RMT examines the source address field SA of several successive frames. If the SA field of several successive frames agree, then the protocol assumes that the SA field has been correctly read, and the protocol can then make decisions about duplicate addresses. That is, in this example, the RMT protocol responds to steady state ring conditions because of the absence of cyclical redundancy check in the RMT protocol.

The implementation of RMT, as set out in the ANSI standards for FDDI referenced hereinabove, involves comparing many received Claim and Beacon frames to the frames sourced by this MAC. Three steps are necessary before the conditions may be applied. It will be readily apparent how to perform these steps, to a person skilled in the art of the FDDI specifications as hereinabove referenced. First, the state of the MAC transmitter is ascertained, including the SA of a received frame, information contained in transmitted frames, and whether MAC is sending claim frames, beacon frames, or repeating frames from another station. Second, several of the received frames are stored in memory. A special mode of operation is briefly enabled to receive Claim or Beacon frames, as Claim or Beacon frames are not normally received. Third, the state of MAC is verified to have been constant for the sample of frames. If so, the four detection conditions are applied to the MAC transmitter state and received frame contents. The SA in each received frame is compared to the list of addresses used (and therefore stripped) by this station. If a match is found, the transmitter state is used to determine if the frame was transmitted by this station. A duplicate address problem is detected when the SA of the received frame matches the list of address but was not recently transmitted. A single such frame is ignored as it may have been created by errors on the media, but many such frames indicate a duplicate address condition has been detected by the RMT process. The above process must be repeated often enough to meet the reaction time specified for RMT, roughly 80 milliseconds.

These four conditions are difficult to implement in a station having an address list containing thousands of addresses. One difficulty is that the protocol, software or hardware, must make the required tests with all addresses in the address list on each source address, in a Beacon or Claim frame received by each station. Also in the example in which RMT responds only to ring steady state conditions, the response is inconveniently delayed.

While the invention has been particularly shown and described with reference to the particular embodiments described hereinabove, it will be understood by those skilled in the art that various changes in form and details may be made therein without departing from the spirit and scope of the invention.

What is claimed is:

1. An apparatus for a station in a communications network, said network of the type having a plurality of stations capable of transmitting frames onto said network, and said stations capable of detecting transmissions on said network, and said stations capable of taking predetermined action in the absence of detecting a frame transmission for a predetermined first time interval, and a first timer for measuring said predetermined first time interval, comprising:
   means for originating information frames onto said network;
   timing means for measuring a second predetermined time interval, said second predetermined time interval being chosen to be less than said first predetermined time interval; and,
   reset means for transmitting a reset frame onto said network by a selected station at times in response to said timing means, and said reset frames being transmitted at intervals substantially equal to said second predetermined time interval, and said reset frames being capable of causing a station to reset said first timer to a beginning value, said reset means capable of transmitting said reset frames between frames transmitted by said originating means.

2. The apparatus of claim 1 wherein said information frames comprises client frames.

3. The apparatus as in claim 2 wherein said times for transmitting a reset frame onto said network by said selected station are selected between frames of a transmission of said client frames.

4. An apparatus for a station of a communications system, said communications system of the type having a token controlled communications ring, a plurality of stations capable of transmitting frames onto said ring, said stations capable of storing a time interval, and said stations capable of detecting transmissions on said ring, and said stations capable of taking predetermined action in the absence of detecting a frame transmission and upon expiration of a timer measuring a predetermined time interval, comprising:
   means for transmitting a token preserver frame onto said ring by a selected station at selected times in order to reset said predetermined time interval stored in each other station on said communications ring; and,
   means for selecting times to transit said token preserver frames between transmission of information frames.

5. The apparatus as in claim 1 or claim 4 further comprising:
   means for transmitting a reset frame onto said network at the conclusion of a transmission.

6. The apparatus as in claim 1 or claim 4 further comprising:
   means for transmitting a reset frame onto said network at the conclusion of an absorbed transmission.

7. The apparatus as in claim 1 or claim 3 further comprising:
   means for transmitting a reset frame onto said network at the conclusion of an aborted transmission.

8. The apparatus as in claim 7 further comprising:
   a second timer set to a beginning value when transmission of said client frames beings, and said second timer expiring after a second predetermined time interval, said second predetermined time interval shorter than said first predetermined time interval;
   means, responsive to expiration of said second timer for transmitting a token preserver frame onto said communications system.

9. An apparatus for a station of a communications system, said communications system of the type having a token controlled communications ring, a plurality of stations capable of transmitting frames onto said ring, and said stations capable of detecting transmissions on said ring, and said stations capable of taking predetermined action in the absence of detecting a frame transmission for a predetermined time interval, comprising:

means for a first station to transmit a plurality of client frames onto said ring;

means for said first station to transmit a token preserver frame between selected client frames after which transmission of said client frames continues, and a second station may detect said token preserver frame and in response thereto resets a timer measuring said predetermined time interval to a beginning value.

10. The apparatus as in claim 9 further comprising:

a second timer set to a beginning value when transmission of said client frames begins, and said second timer expiring after a second predetermined time interval shorter than said predetermined time interval;

means responsive to expiration of said second timer, for transmitting a token preserver frame onto said communications system.

11. A communications system comprising:
a token controlled communications ring;
at least a first station and a second station, said first station and said second station each having an address, said first and said second stations capable of transmitting frames onto said ring, said frames having source addresses placed therein, said first and second stations each having a timer capable of storing a time interval, and said second station capable of detecting transmissions on said ring, and said second station capable of taking predetermined action in the absence of a frame transmission for a predetermined time interval;

means for said first station to transmit a plurality of client frames onto said ring;

means for said first station to transmit a token preserver frame between selected client frames after which transmission of said client frame continues;

means, responsive to said second station receiving said token preserver frame, for said second station to reset said timer for said predetermined time interval and avoid said second station taking said predetermined action in the absence of receipt by said second station of client frames transmitted by said first station.

12. The apparatus of claim 11 further comprising:
a source address field in each of said frames, said source address field containing an address of a station transmitting said frame;
another station, and said client frames are not received by said second station as a result of said client frames being stripped from said ring by said another station having an address duplication a source address of said first station.

13. The apparatus of claim 12 wherein said at least a third station further comprises one station.

14. The apparatus as in claim 12 wherein said at least a third station comprises a plurality of stations.

15. A communications system, comprising:
a first local area network;
a second local area network;
a bridge for forwarding frames from said first local area network to said second local area network;

a first station on said first local area network, said first station capable of transmitting frames having a selected address placed within a source address field of said frames;

a second station on said second local area network, said second station having at least one address used for source address stripping of frames from said second local area network;

at least a third station on said second local area network, said at least a third station capable of receiving frames transmitted onto said second local area network by said bridge after said frames transmitted by said bridge first pass through said second station, said at least a third station having a TVX timer capable of initiating predetermined action in the event that no frame is detected by said at least a third station during a TVX time period;

means for said bridge to transmit token preserver frames onto said second local area network, said token preserver frames capable of resetting a TVX timer in said at least a third station, and said token preserver frames capable of not being stripped by said second station; and, in the event that frames transmitted by said first station are addressed to said at least a third station and said selected address placed within a source address field of said frames by said first station is contained in said at least one address used by said second station for source address stripping, said frames being stripped by said second station before said frames reach said third station, said token preserver frame preventing said TVX timer in said at least a third station from expiring and thereby preventing said at least a third station from initiating said predetermined action.

16. The apparatus as in claim 15 wherein said bridge further comprises;

means for maintaining a SA list for the purpose of stripping frames forwarded by said bridge onto said second local area network, said token preserver frame preventing a duplication between an address in said SA list and a station my address or address in a station SA list on said second local area network from resulting in said expiration of said TVX timer in said at least a third station on said second local area network.

17. The apparatus as in claim 15 wherein said bridge does not maintain an SA list of address appearing in a source address field of any forwarded frames.

18. The apparatus as in claim 1 or claim 10 or claim 11 or claim 15, wherein said predetermined action further comprises fault recovery and ring initialization.

19. The apparatus as in claim 1 or claim 10 or claim 11 or claim 15, wherein said token preserver frame is a ownerless void frame.

20. The apparatus as in claim 1 claim 10 or claim 11 or claim 15, wherein said token preserver frame is an implementer frame.

21. The apparatus as in claim 1 or claim 10 or claim 11 or claim 15, wherein said token preserver is a well formed void frame.

22. A communications system, comprising:
a first local area network;
a second local area network;
a bridge for forwarding frame from said first local area network to said second local area network;

a first station on said first local area network, said first station capable of transmitting frames having a selected address placed within a source address field of said frames;

a second station on said second local area network, said second station having at least one address used for source address stripping of frames from said second local area network;

at least a third station on said second local area network, said at least a third station capable of receiving frames transmitted onto said second local area network by said bridge after said frames transmitted by said bridge first pass through said second station, said at least a third station having a TVX timer capable of initiating fault recovery and ring initialization in the event that no frame is detected by said at least a third station during a TVX time period;

means for said bridge to transmit token preserver frames onto said second local area network, said token preserver frames capable of resetting a TVX timer in said at least a third station, and said token preserver frames capable of not being stripped by said second station; and, in the event that frames transmitted by said first station are addressed to said at least a third station and said selected address placed within a source address field of said frames by said first station is contained in said at least one address used by said second station for source address stripping, said frames being stripped by said second station before said frames reach said third station, said token preserver frame preventing said TVX timer in said at least a third station from expiring and thereby preventing said at least a third station from initiating said fault recovery and ring initialization.

23. A method for controlling a communications system of the type having a token controlled communications ring, a plurality of stations capable of transmitting frames onto said ring, and said stations capable of detecting transmissions on said ring, and said stations capable of taking predetermined action in the absence of detecting a frame transmission for a predetermined time interval, comprising:

transmitting a plurality of client frames onto said ring by a first station;

transmitting, by said first station, a token preserver frame between selected client frames after which transmitting said client frames continues;

resetting a timer measuring said predetermined time interval to a begining value in a second station and avoiding said second station taking said predetermined action in the absence of receipt by said second station of client frames transmitted by said first station, in response to said second station receiving said token preserver frame.

24. An apparatus in a station for controlling a communications system of the type having a token controlled communications ring, a plurality of stations capable of transmitting frames onto said ring, and said stations capable of detecting valid transmissions on said ring, and said stations capable of taking predetermined action in the absence of detecting a valid transmission for a predetermined time interval, said stations capable of aborting a transmission and passing the token to a next station without transmitting a valid frame onto said ring, comprising:

means for transmitting a token preserver frame onto said ring after abortion of a transmission and before transmitting a token for reception by a next station.

25. A method for controlling a communications system of the type having a token controlled communications ring, a plurality of stations capable of transmitting frames onto said ring, and said stations capable of detecting valid transmissions on said ring, and said stations capable of taking predetermined action in the absence of detecting a valid transmission for a predetermined time interval, said stations capable of aborting a transmission and passing the token to a next station without transmitting a valid frame onto said ring, comprising:

transmitting a token preserver frame onto said ring after abortion of a transmission and before transmitting a token for reception by a next station.

26. An apparatus for a station in a communications network, comprising:

a plurality of stations capable of transmitting frames onto said network, and said stations capable of detecting transmissions on said network, and said stations capable of taking predetermined action in the absence of detecting a frame transmission for a predetermined first time interval, and a first timer for measuring said predetermined first time interval;

means for originating information frames onto said network;

timing means for measuring a second predetermined time interval, said second predetermined time interval being chosen to be less than said first predetermined time interval; and, reset means for transmitting a reset frame onto said network by a selected station at times in response to said timing means and said reset frames being transmitted at intervals substantially equal to said second predetermined time interval, and said reset frames being capable of causing a station to reset said first timer to a beginning value, said reset means capable of transmitting said rest frames between frames transmitted by said originating means.

27. An apparatus for a station of a communications system, said communication system of the type having a token controlled communications ring, a plurality of stations capable of transmitting frames onto said ring, and said stations capable of detecting transmissions on said ring, and said stations capable of taking predetermined action in the absence of detecting a frame transmission for a predetermined time interval, comprising:

means for transmitting a token preserver frame onto said ring by a selected station at selected times in order to reset said predetermined time interval in each other station on said communications ring; and, means for selecting said selected times to transmit said token preserver frames between transmission of information frames.

28. The apparatus as in claim 25 or claim 26 further comprising:

means for transmitting a reset frame onto said network at the conclusion of a transmission.

29. An apparatus for a station of a communications system, said communications system of the type having a token controlled communications ring, comprising:

a plurality of stations capable of transmitting frames onto said ring, and said stations capable of detecting transmissions on said ring, and said stations capable of taking predetermined action in the absence of detecting a frame transmission for a predetermined time interval comprising:

means for a first station to transmit a plurality of client frames onto said ring;

means for said first station to transmit a token preserver frame between selected client frames after which transmission of said client frames continues, and a second station may detect said token preserver frame and in response thereto resets a timer measuring said predetermined time interval to a beginning value.

* * * * *